(12) United States Patent
Korus et al.

(10) Patent No.: US 6,785,254 B2
(45) Date of Patent: Aug. 31, 2004

(54) WIRELESS COMMUNICATION SYSTEM INCORPORATING MULTICAST ADDRESSING AND METHOD FOR USE

(75) Inventors: Mike Korus, Hoffman Estates, IL (US); Dan McDonald, Cary, IL (US); Mario DeRango, Wauconda, IL (US); George Popovich, Palatine, IL (US); John W. Maher, Woodstock, IL (US)

(73) Assignee: Motorola, Inc., Schaumburg, IL (US)

( * ) Notice: Subject to any disclaimer, the term of this patent is extended or adjusted under 35 U.S.C. 154(b) by 236 days.

(21) Appl. No.: 09/728,360

(22) Filed: Dec. 1, 2000

(65) Prior Publication Data

US 2002/0097718 A1 Jul. 25, 2002

(51) Int. Cl.7 ............................................. H04L 12/56
(52) U.S. Cl. .................... 370/338; 370/350; 370/432
(58) Field of Search ................................. 370/390, 312, 370/432, 338, 400, 401, 465, 349; 455/518, 519, 426, 520

(56) References Cited

U.S. PATENT DOCUMENTS

| | | | |
|---|---|---|---|
| 5,331,637 A | * | 7/1994 | Fancis et al. |
| 5,361,256 A | * | 11/1994 | Doeringer et al. |
| 5,724,648 A | | 3/1998 | Shaughnessy et al. |
| 5,761,193 A | * | 6/1998 | Derango et al. ............ 370/312 |
| 6,078,590 A | * | 6/2000 | Farinacci et al. ........... 370/342 |
| 6,141,347 A | * | 10/2000 | Shaughnessy ............... 370/390 |

FOREIGN PATENT DOCUMENTS

WO    WO00/51373    8/2000

OTHER PUBLICATIONS

GIT-CC-95/15, Core Selection Methods for Multicast Routing.
Liu, et al.; Scalable Multicast Routing; MILCOM 97 Proceedings Monterey, CA, USA Nov. 2–5, 1997, New York, NY pp. 983–987, XP010260845.
Murata, S., et al.; A Network Architecture for Reliable Process Group Communication, Distributed Computing Systems, 1994; Proceedings of the 14$^{th}$ International Conference on Pozman, Poland Jun. 21–24, 1994, LosAlamitos, CA, IEEE Comput.Soc; Jun. 21, 1994 pp. 66–73, XP010099469.
Reilly W. J., et al.; Kaleida Health Utilization of New Network Technologies to Deliver Digital Video, Research Challenges, 2000, Proceedings, Academia/Industry Working Conference on Buffalo, NY Apr. 27–29, 2000, Los Alamitos, CA IEEE Comput.Soc. Apr. 27, 2000, pp. 183–189, XP010500446.

* cited by examiner

*Primary Examiner*—Kenneth Vanderpuye
(74) *Attorney, Agent, or Firm*—Val Jean F. Hillman; Terri S. Hughes; Indira Saladi

(57) ABSTRACT

A Packet Network for use in association with a wireless communication system employs packet distribution and call set-up methods optimized to select from a plurality of network routing devices, a single node (i.e., Rendezvous Point (VP) or.multicast core) as a function of attributes exhibited by the communication devices involved in the call or as a function of various communication system performance and/or quality of service (QOS) attributes, including but not limited to, bandwidth requirements, resource availability, network processing capacity, network response time, network traffic data, information technology and other knowledge and know-how regarding system equipment, system software, system integration, installation and/or deployment, bit error rate (BER), received signal strength indication (RSSI), quality of service (QOS) metrics, and any other measure of system performance or call quality.

25 Claims, 7 Drawing Sheets

WIRELESS COMMUNICATION SYSTEM INCORPORATING MULTICAST ADDRESSING AND METHOD FOR USE

CROSS REFERENCE TO RELATED PATENTS

This application is related to U.S. Pat. No. 6,141,347, granted Oct. 31, 2000, entitled "Wireless Communication System Incorporating Multicast Addressing and Method For Use" and U.S. patent application Ser. No. 09/464,269, filed Nov. 15, 2000, entitled "Methods for Implementing A Talk Group Call In A Multicast IP Network" both as assigned to the assignee of record in the present application.

FIELD OF THE INVENTION

The present invention relates generally to communication systems and, more particularly to packet-based communication systems. In particular, the present invention relates to a wireless communication system that incorporates Multicast IP addressing.

BACKGROUND OF THE INVENTION

While the specification concludes with claims defining the features of the invention that are regarded as novel, it is believed that the invention will be better understood from a consideration of the following description in conjunction with the drawing figures, in which like reference numerals are carried forward.

Today's wireless communication systems provide a broad range of services to individual subscriber units and groups of subscriber units, while either stationary or on the move. These services include, but are not limited to, cellular telephony, group dispatch, and packet data communication, to name a few. An example of such a system 100 is illustrated in FIG. 1. The configuration shown in FIG. 1 is typical in several standardized wireless communications systems, such as, for example Global System for Mobile Communication (GSM), Advanced Mobile Phone Service (AMPS), and Trans-European Trunked Radio (TETRA) systems. It may likewise be applicable to various proprietary communication systems such as, for example, the Integrated Digital Enhanced Network (iDEN™) or SMARTZONE™ systems, which have, in the past, been available by contacting Motorola, Inc. at 1301 East Algonquin Road Schaumburg, Ill. 60196.

With reference to FIG. 1, a central switch 101 provides connections between sites 104–107. A plurality of subscriber units 110–115 wirelessly communicate with the sites 104–107 and each other, and are often logically divided into various subgroups or talk groups. In such a system, the call processing management and switching functionality are generally contained within the same physical unit, i.e., the central switch 101. The sites 104–107 are connected to the central switch 101 through dedicated or on-demand links and intermediate processors 102–103 in what is often called a "star" configuration. Some very large systems use a hierarchy of such "stars" where intervening concentrators group links from multiple sites and perform various lower level processing tasks before submission to the central switch.

Wireless communication networks as described above typically use a centralized mobility management function. As subscriber units move from site to site, they indicate movement to the network through handover and location update procedures. The location change information is forwarded to a hierarchical network of location databases, usually called visitor location registers (VLR) and home location registers (HLR). The centralized connection/mobility management functionality in the central switch 101 or hub, as it is frequently referred to, uses location information to determine which sites need to be included when a call request is made. While this star configuration and operations management meets the needs of the communication system previously mentioned, centralized and/or hierarchical communication system topologies nevertheless suffer from a number of problems.

First, the physical link back-haul required to support all links to the central switch or hub 101 can be quite cost prohibitive. In a typical system, all communications traffic is routed back to the central switch or hub 101. This may prove particularly expensive when either the switch 101 is located far from the site in question or in the case where the lines to the switch 101 are leased. Furthermore, the resulting network typically needs to be configured at the start of each call. That is, each time a call request is made, a series of dedicated network connections must be established before the call can proceed. This requirement frequently adds to otherwise undesirable processing delays.

Current systems also suffer from the risk of a single point of failure. That is, to say, if a central switch 101 goes down or is cut off from the network, large amounts of communications traffic will be lost and new call requests cannot be honored. Similarly, if the VLR associated with the central switch is somehow cut off from the network or fails, or if the HLR cannot be reached, calls to and from subscriber units are negatively impacted, and in many instances cannot be completed.

In accordance with the foregoing, there exists a need for a non-hierarchical communication system topology that decentralizes mobility processing. Such a system should provide easy scalability, minimize or eliminate network connection processing at call initiation, and avoid traditional susceptibilities to the single point of failure concern. In addition, such a system should be optimized to support a growing number user services such as, for example, telephone interconnect, group dispatch, messaging services (e.g., two-way alphanumeric paging), packet data transmission, voice and/or video communications, and combinations thereof (hereinafter referred to as "Multimedia").

DESCRIPTION OF A PREFERRED EMBODIMENT

The present disclosure therefore has identified various methods for selecting a Rendezvous Point in a multicast IP packet addressed routing system and methods for implementing dispatch calls using IP multicasting protocols in multiple-zone architectures. The methods provide for efficient use of communication resources, through dynamic assignment of IP multicast addresses on a call-by-call basis for transmission of varying content payload messages.

Figure 1:
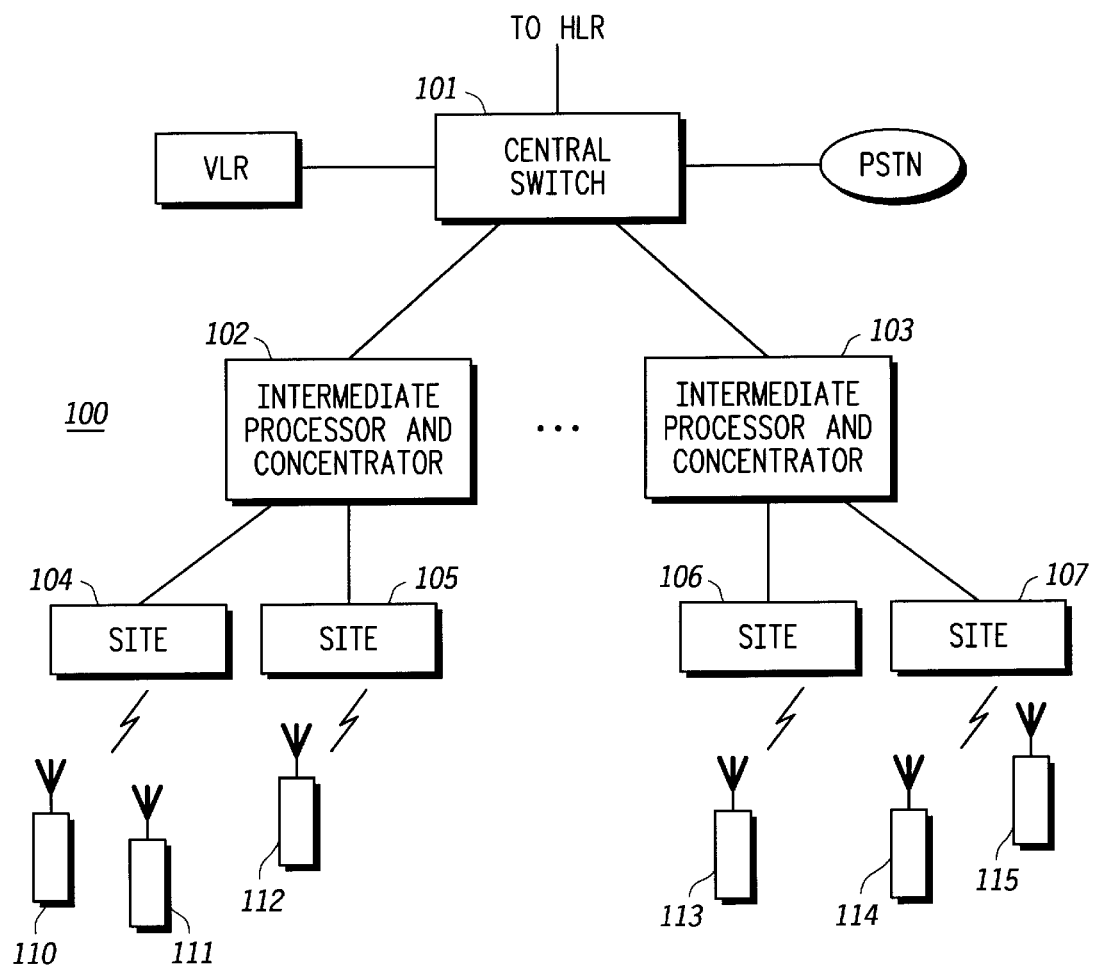
FIG. 1 is a system block diagram of a prior art wireless communication system.
Figure 2:
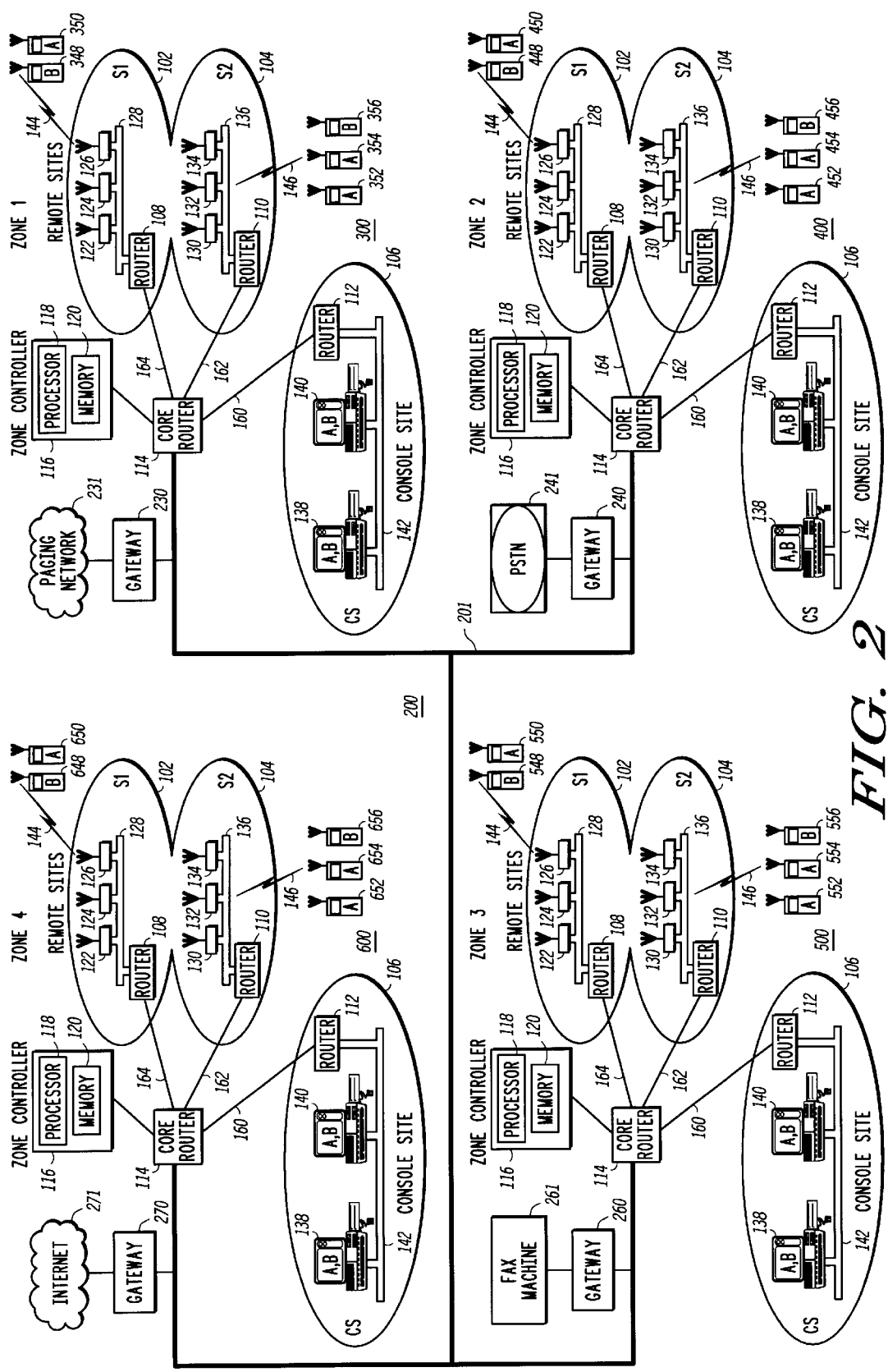
FIG. 2 is a system block diagram depicting a wireless communication system in accordance with the present invention.

With reference to FIG. 2, the wireless communication system 200 of the present invention comprises a packet network 201 that supports Internet Protocol (IP) multicast addressing of packets to provide group or dispatch call service. As will be appreciated by those skilled in the art, multicast packets are, by definition, those packets with IP Destination Addresses whose four most significant bits are "1110"—that is, they have the form 1110.multi-cast-group. In dotted-decimal notation, the range of IP multicast addresses, also know as Internet Class D Addresses, are 224.0.0.1 through 239.255.255.255.

As will be appreciated by those skilled in the art, several multicast IP protocols are available for use in packet network 201 of the system 200. In accordance with the present invention, the packet network 201 employs a Sparse Mode IP multicast protocol and in particular the Protocol Independent Multicast-Sparse Mode (PIM-SM) protocol. While the use of PIM-SM requires that a single Rendezvous Point be designated as the center for each multicast routing tree, it will be appreciated by those skilled in the art that the choice of a single Rendezvous Point, hereinafter frequently referred to as the "core" will influence overall network performance during such selection. In accordance, the present invention sets forth a packet distribution and call set-up methodology optimized for use in packet network communication system that support a number of user services such as, for example, telephone interconnect, group dispatch, messaging services (e.g., two-way alphanumeric paging), packet data transmission, voice and/or video communications, and combinations thereof.

As previously mentioned, FIG. 2 illustrates a communication system 200 comprising a packet network 201. With reference to FIG. 2 the packet network 201 is coupled to a plurality of remote sites 102–106, which sites operate to provide differing zones of coverage designated Zones 1–4. Each zones of coverage has at least one core router 114 coupled to each site through routers 108, 110, 112. The routers 108–114 may comprise, for example, 3Com "NetBuilder" series routers or the series 2600, 3640, 7200, and 7500 routers, which have in the past been available from Cisco. The core router 114 is coupled to a zone controller 116 having a processor 118 (such as, for example a microprocessor, micro-controller, digital signal processor or some combination thereof) and a memory 120 (such as volatile or non-volatile digital storage devices or some combination thereof). In one embodiment of the present invention, the zone controller 116 manages and assigns IP multicast addresses for payload (voice, data, video, etc.) and control messages between and among the various sites 102, 104, 106 both internal and external to its respective zone.

As shown in FIG. 2, each site 102 includes a plurality of repeaters 122, 124, 126 that are coupled via local area network (LAN) 128 such as, for example, Ethernet, Token Ring, or any other commercial or proprietary LAN technology, to a router 108. Similarly, each site 104 includes a plurality of repeaters 130, 132, that are coupled via local area network (LAN) 136 such as, for example, Ethernet, Token Ring, or any other commercial or proprietary LAN technology, to a router 110. As will be appreciated, the repeaters at the various sites 102, 104 communicate, via wireless communication resources 144, 146 with a plurality of subscriber units 348–656, which may comprise mobile or portable wireless radio units. As will be appreciated, wireless communication resources 144, 146 may comprise any of the currently available resources, such as, for example, radio frequency (RF) technologies, including, but not limited to Code Division Multiple Access (CDMA), Time Division Multiple Access (TDMA), Frequency Division Multiple Access (FDMA), and the like. Moreover. The Invention of the present application may be used in any of the currently available Radio Frequency (RF) communication systems, such as, for example, Global System for Mobile communication (GSM), General Packet Radio Service (GPRS), Universal Mobile Telecommunications Service (UMTS), Trans-European Trunked Radio service (TETRA), Association of Public Safety Communication Officers (APCO) Project 25, Personal Communication Service (PCS), Advanced Mobile Phone Service (AMPS) and the like. In the alternative, other wireless technologies, such as those now known or later to be developed and including, but not limited to, infrared, Bluetooth, electric field, electromagnetic, or electrostatic transmissions, may likewise suffice.

In accordance with the present invention, preferable wireless resources 144, 146 comprise multiple RF channels such as pairs of frequency carriers, TDMA time slots, CDMA channels, and the like. In the case where the communication resources comprise RF channels, it is common to assign separate channels and/or separate repeaters for different types of communication traffic. Thus, the repeaters at the various sites 102, 104 may comprise control channel repeaters, voice channel repeaters and/or link repeaters. For convenience, the term "repeater site" or simply "base site" will be used hereinafter instead of referring specifically to the repeater(s) at a particular site.

In contrast, site 106 includes a plurality of dispatch consoles 138, 140 that are coupled via Ethernet LAN 142 to router 112 and defines a "console" site. Although not shown in FIG. 2, it will be appreciated that a single site may include both repeaters and console positions.

Practitioners skilled in the art will appreciate that the communication system 200 may include various other communication devices not specifically shown in FIG. 2. For example, the packet network 201 comprises a link, 201 such as, for example a T1 line or E1 digital carrier system that connects core routers 114 to a public switched telephone network (PSTN) 241 via a telephone gateway 240, a paging network or short message system 231 via a paging gateway 230, and a facsimile machine or similar device 261 via fax gateway or modem 260. In addition, packet network 201 may be connected via gateway 270 to a number of additional content sources 271, such as the Internet or various Intranets. In support thereof, the network 201 may include any number or type of wire line communication device(s), site controller(s), comparator(s), telephone interconnect device (s), internet protocol telephony device(s), call logger(s), scanner(s) and gateway(s, collectively referred to herein as a fixed device(s). Generally, such communication devices may be either sources or recipients of payload and/or control messages routed through the packet network 201. By way of example and not by way of limitation several such devices are described briefly herein below.

A site controller is a device having a processor (such as a microprocessor, micro-controller, digital signal processor (DSP) or combinations thereof) and a memory (such as volatile or non-volatile digital storage devices or combinations thereof) that may be located at a particular site. A site controller may be used to control the communication of payload and/or control messages between repeater(s) at a particular site. A site controller may also control communications between the repeater(s) and their associated router. In one embodiment, for example, a site controller sends Internet Group Management Protocol (IGMP) Leave and Join messages to a router associated with a particular site to enable the repeater(s) at that site to receive payload and/or control messages addressed to particular multicast group address(es).

A comparator (or "voter") is a device, usually connected by wire to various receivers (e.g., different repeaters) receiving different instance(s) of a particular message or signal (e.g., from a subscriber radio unit). The comparator receives and compares among the different instances of the signal that may be received by the different receivers, and produces an output message that is comprised of either an entire message from one of the receivers or a composite message comprised of segments of the message received from one or more of the receivers. Each message may be comprised of a plurality of message frames.

A scanner is a receiver that is adapted to monitor message transmissions from communication devices such as mobile or portable wireless radio units, consoles, repeaters, and the like. In one mode of operation, for example, a scanner scans the radio frequency spectrum for the purpose of finding and, optionally, locking onto carrier frequencies containing message transmissions. Scanners are sometimes used by parties that are not intended recipients of the message transmissions and thus may or may not be members of a particular talk group for which the message transmissions are intended.

A telephone interconnect device is a network-based device that provides voice transcoding services between mobile and land line subscribers when invoking full duplex telephone calls between those two subscribers. A transcoding service is required, for example, when a mobile subscriber using ACELP vocoding requests a call to a subscriber in the public switched telephone network (PSTN) using 64-kilobit per second Pulse Code Modulation (PCM) vocoding.

An internet protocol telephony device comprises a telephone that transports voice and/or control messages over a LAN to a telephony gateway box, which interfaces multiple (LAN based) phones and converts the IP control and audio packets back into the format of the local PSTN. More generally, a gateway device is one that provides voice and control translation services between two dissimilar communication systems. For example, a gateway device would be required if an APCO Project 25 compliant communication system were to be connected to a GSM communication system. Other services such as feature translation, authentication, authorization and encryption could also be provided by a gateway device.

A call logger is a networked based device that records packetized voice talk group and private calls in a public safety system. A call logger could also record data calls. A call logger device typically stores the voice payload in its native format (i.e. vocoded audio). When it is desirable to playback the voice conversation at a later time, the call logger retrieves and decodes all packets which bound the call in question.

As will be appreciated by those skill in the art, all device desiring to receive network traffic pertaining to a particular multicast group will necessarily need to perform the IGMP join and leave functions as known in the art and described, in part herein above.

For purposes of demonstration, the plurality of subscriber units 348–656 are logically arranged into talk groups, which talk groups have corresponding talk group identifications as is known in the art. Two separate talk groups are shown in FIG. 2., and identified by labels "A" and "B." Talk group "A" at least includes the subscriber units having reference numerals ending in 0, 2, and 4. Talk group "B" at least includes the subscriber unit having reference numeral ending in 6 and 8. Console positions 138, 140 can affiliate with either, or both talk groups "A" and "B" and, accordingly, may be considered members of both talk groups "A" and "B." As those having ordinary skill in the art will recognize, any number of talk groups having corresponding talk group identifications can be established within the system 200.

According to a preferred embodiment of the present invention, zone controllers 116 dynamically assigns and manages respective payload and control IP multicast addresses for payload (voice, data, video, etc.) and control messages between and among subscribers and consoles at the various sites 102, 104, 106 within each respective zone of coverage and any other fixed device participating In the call. As will be appreciated such fixed device may comprise. That is, multicast group addresses for particular calls are not fixed (and therefore, are not stored in memory of devices distributed throughout the network) but rather are identified and assigned by the zone controller 116 on a call-by-call basis. As such, a particular multicast group address is only temporarily assigned to any one call and can be reassigned to different calls as needed or desired. Dynamic, rather than static assignment of addresses is advantageous in terms of efficient use of resources in the network. One reason is because, in the static example, various multicast addresses (perhaps hundreds) associated with all of the different talk groups in the network must be stored in the memory of various network devices, even though less than all of the talk groups are generally active at any particular time. Moreover, even among talk groups that are active, those talk groups may not require use of all the network devices, for example, if they do not have members at each site. Thus, dynamic assignment of addresses is preferred. Alternatively, however, static assignment of addresses can be done.

Multipoint routes pertaining to the IP multicast addresses used in the present invention are maintained by the routers 108–114 forming the network 201. IP Multicast is based on the well-known Internet Group Management Protocol (IGMP) that allows a multicast router to track the existence of multicast group members on local networks coupled to that router. Additionally, multicast routers use the information provided by IGMP in conjunction with a multicast routing protocol to support forwarding of data across a network of routers. Given the nature of wireless communication systems, sparse mode protocols such as the Core Based Tree (CBT) protocol and the Protocol Independent Multicast—Sparse Mode (PIM-SM) protocol are preferred multicast routing protocols for use in the present invention. However, it is anticipated that dense mode protocols such as the Distance Vector Multicast Routing Protocol (DVMRP), the Multicast Open Shortest Path First (MOSPF) protocol, the Protocol Independent Multicast—Dense Mode (PIM-DM) protocol or other protocols that may be devised in the future may also be used to implement the present invention. A common feature of these multicast routing protocols is that each establishes a "spanning tree" or "routing tree" which, for a given multicast group, defines all of the router interfaces which contain group members and the necessary routes between these interfaces to provide the multicast distribution with a minimum amount of data replication.

In order to Improve network performance and Increase the utilization of network resources, the present invention seeks to advantageously pre-assign and/or associate a unique range of IP multicast addresses to each Rendezvous Point within the packet network 201 and thereafter, depending on various network, system, and/or call request attributes, select a Rendezvous Point that is more optimal for system performance than the randomly selected Rendezvous Point.

Figure 3:
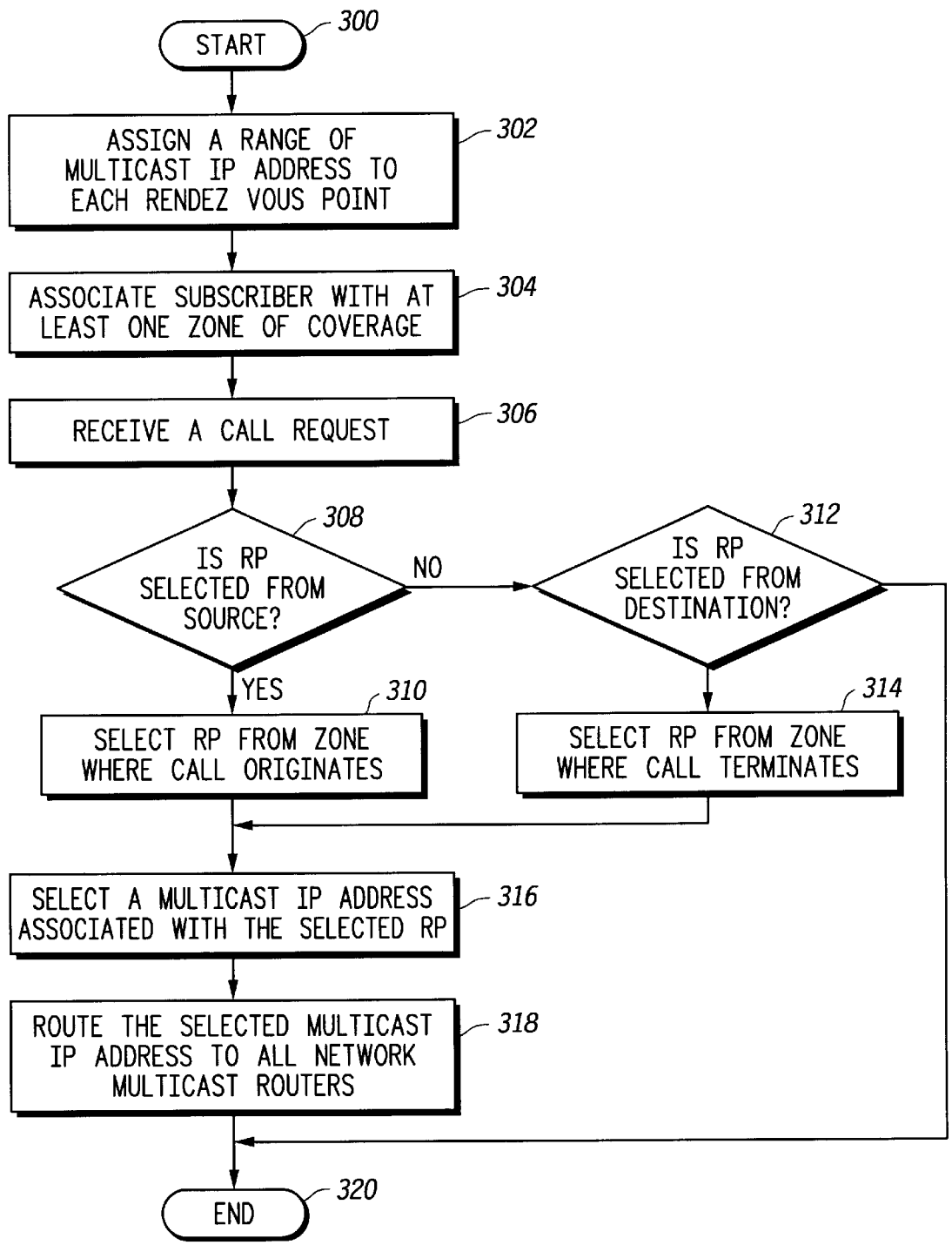
FIG. 3 is a flow chart illustrating the operation of selecting a multicast Rendezvous Point in accordance with an embodiment the present invention.

With reference to FIG. 3, a flow chart diagram illustrating the operation of selecting a Rendezvous Point or "multicast core" based upon call source or destination information is shown. The flow charts of FIGS. 3, 4, and 6 assume the existence and availability of information relating to the location of subscriber unit devices operating within the system 200 of FIG. 2. Since the determination, storage, and retrieval of subscriber location information is well within the knowledge of those skilled in the art, it will not be discussed here in detail. The interested reader may nevertheless refer to U.S. Pat. No. 5,724,648 for additional information on the subject. In addition, the steps of FIGS. 3–6 are implemented using software routines and/or programs stored within the Zone controller 116, routers 108–114 of the packet network 201, as well as the subscriber units 348–565, where applicable.

Commencing at start block 300 flow proceeds to block 302 where each Rendezvous Point is assigned a unique set of multicast IP addresses. By way of example, the information may be stored in memory at each core routing device 114 and/or in a memory storage device 120 within the zone controller 116 of each Zone. By way of further example and not by way of limitation, Zones 1–4 may exhibit the following multicast IP address assignments (hereinafter referred to as a "map of partitioned addresses to Rendezvous Points" or simply the "map"):

| MAP I | |
|---|---|
| Zone 1: | 224.0.0.1 through 225.134.120.78 |
| Zone 2: | 225.200.0.1 through 228.71.23.65 |
| Zone 3: | 228.200.0.1 through 231.202.98.14 |
| Zone 4: | 232.200.0.1 through 239.249.145.21. |
| MAP II | |
| Zone 1 router 114a: | 224.0.0.1 through 224.25.0.0; |
| Zone 1 router 114b: | 224.25.0.1 through 225.50.0.0; |
| Zone 1 router 114c | 224.50.0.1 mthrough 224.75.0.0; |
| Zone 2 router 114d | 225.0.0.0 through 225.134.120.78. |

In accordance with the present invention, the set of IP multicast addresses available within each zone are assigned either a single PIM-SM Rendezvous Point (e.g., core router 114) Per Map I or a plurality of routers which collectively provide the core router 114 functionality. Per map II. As will be appreciated, all multicast enabled routers within the packet network 200 will pass the map to each other via well known routing protocols. This operation assures all routers in the packet network 201 receive an identical view of the IP multicast address partitioning and that every router in the network 201 knows the range of addresses supported by each Rendezvous Point. In accordance with the preferred embodiment, an election has been made to assign the Rendezvous Point function to core router 114. As such, site routers 108–110 and console routers 112, while supporting IP multicast addressing, are not assigned the Rendezvous Point function in accordance with the preferred embodiment of the present invention.

Notwithstanding, It will be appreciated by those skilled in the art that multicast IP addresses may be applied or distributed across a plurality of routing devices, 108, 110, 112, 114 logically resident within a particular Zone 1–4. By way of example and not by way of limitation Zones 1—may exhibit the following map.:

| Map III | |
|---|---|
| Zone 1 router 108: | 224.0.0.1 through 224.25.0.0; |
| Zone 1 router 110: | 224.25.0.1 through 225.50.0.0; |
| Zone 1 router 112 | 224.50.0.1 mthrough 224.75.0.0; |
| Zone 2 router 114 | 225.0.0.0 through 225.134.120.78. |

From block 302, flow proceeds to block 304 where a relationship is established between each subscriber device 348–656 and at least one zone of RF coverage. Said another way, each subscriber device 348–656 is associated with at least one system coverage zone (e.g., Zone 1–4). As will be appreciated by those skilled in the art this relationship or association can be static or dynamic and is typically a function of subscriber location or registration. Association concepts available for use in the current invention include, but are not limited to, Home v. Current Zone, Registered v. Roaming users, and the like.

As will be appreciated by those of ordinary skill, the Home Zone or Registered user paradigm implies the existence of a pre-established correspondence or relationship between a subscriber unit involved in a call and a particular coverage zone (i.e., Z1–Z4), regardless of that subscriber's location upon its transmission or initiation of any call request and the associated receipt thereof of at a Zone Controller 116 per step 306. For example, with reference to FIG. 2, subscriber units 352, 354, and 356 are currently serviced by Zone 1, site S2. Assuming Zone 1 site S2 is deployed in a geographical area where subscriber units 352–356 frequent, Zone 1 site S2 may be fairly characterized as the Home service site for subscribers 352–356. Under this paradigm, units 352–356 will likely be registered in memory 120 of zone controller 116 for Zone 1 for purposes of identification, authentication, level of service, billing, call processing, and maintenance and support. Thus, the notion of a Home Zone in a wireless communication system suggests a geographical area having a zone of coverage that provides frequent, primary, or sole access to a set of users, such users being registered for use, such registration information typically being housed or stored contemporaneously at a site within the Zone of interest.

In contrast, the Current Zone or Roaming user paradigm implies an association between subscriber units 3498–656 based upon the current location of the subscriber unit within the system 200 of FIG. 2 regardless of where the unit frequently receives communication. By way of example, with reference to FIG. 2, and assuming the Current Zone or Roaming user convention, upon receipt of a call request by Zone Controller 116 at step 306, subscriber units 448 and 450 may be associated with Zone 2, regardless of whether Zone 2 is, in fact, the Home Zone for units 448 and 450. Current Zone or Roaming user information is so closely tied to subscriber location that continually tracking and maintaining subscriber units location information cross-referenced against whether the subscriber of interest is within its Home Zone of coverage is one simplistic way of establishing and maintaining an association as called for in step 304.

Returning to the discussion of FIG. 3, upon completion of steps 302 and 304, flow proceeds to block 306, where, upon receipt of a call request by the system 200, flow proceeds to blocks 308 and 312 where a determination is made whether the packet network 201 Rendezvous Point is to be selected based upon call source or destination information. Assuming Rendezvous Point selection is based upon the call source, flow proceeds from block 308 to block 310 where, upon application of Current Zone rules, a Rendezvous Point in the Zone from which the call originated is selected. In keeping with current working examples, a talk group call from a subscriber unit 348–356 whose talk group has zone I as home zone will cause (the core router 114 of Zone 1 to be selected as the core router) for the talk group call of interest. As will be appreciated upon further reflection, however, application of the Home Zone paradigm to the selection process at block 310 is likely result in the selection of a different Rendezvous Point, particularly when the source device is not within its Home Zone when generating a call request.

If on the other hand, the Rendezvous Point is selected based upon the destination or recipient of the call, flow proceeds from block 312 to block 314 where a Rendezvous Point is selected in the Zone where the subscriber unit destined to receive the call is located.

From blocks 310 and 314, flow proceeds to block 316 where one of the unique multicast IP addresses within the map of the selected Rendezvous Points is selected for use in association with the call in question. From block 316, flow proceeds to block 318 where that selected multicast IP address is routed to all multicast routers within the packet network 200 of FIG. 2.

Figure 4:
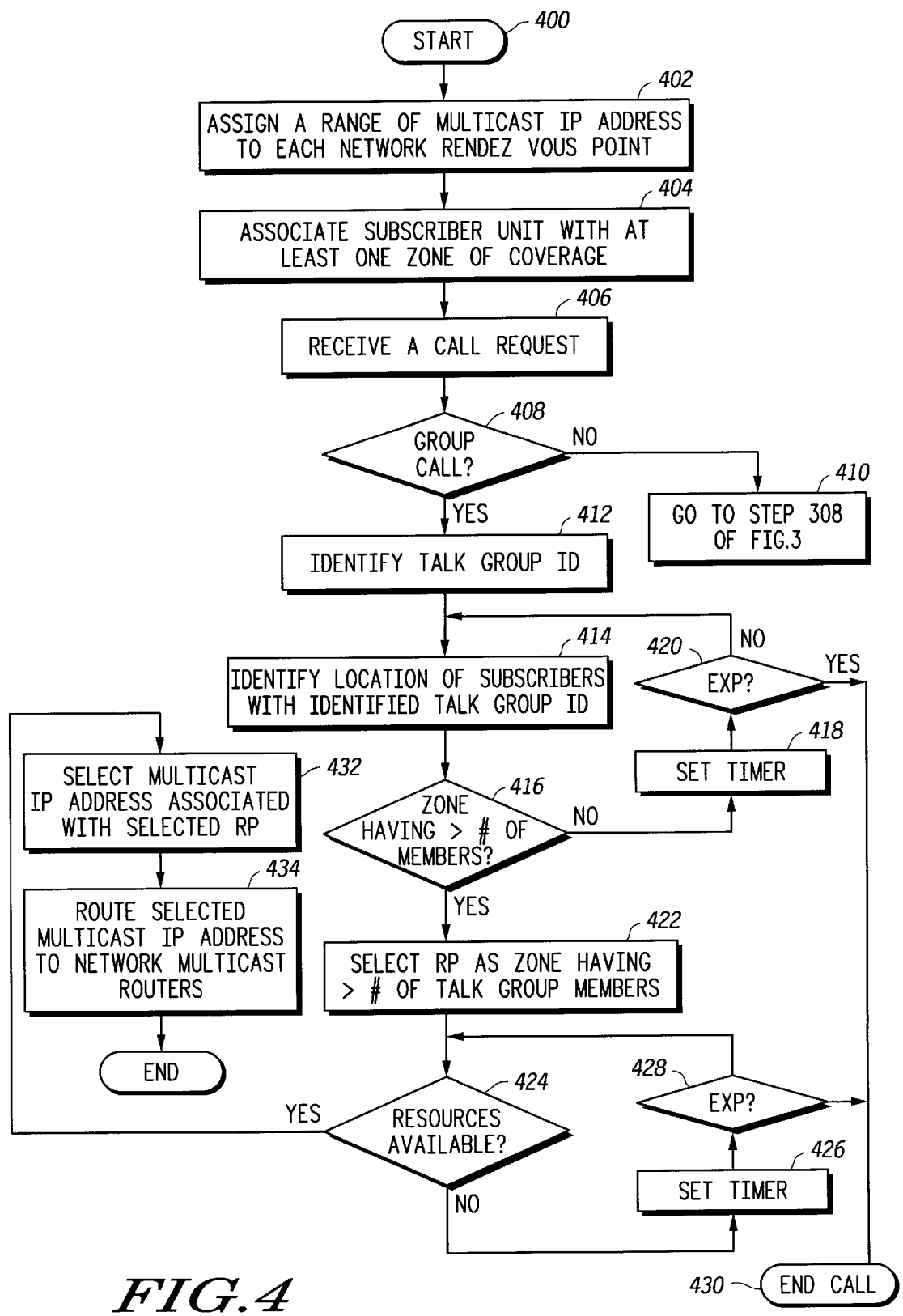
FIG. 4 is a flow chart illustrating the operation of selecting a multicast Rendezvous Point in accordance with another embodiment the present invention.

FIG. 4 is a flow chart diagram illustrating the operation of selecting a multicast Rendezvous Point in accordance with an alternate embodiment of the present invention. As will be appreciated upon further review, flow commences at start block 400 and proceeds to block 402 where each Rendezvous Point In the packet network 201 of FIG. 2 is assigned a unique set of multicast IP addresses. By way of example, the information may be stored in memory at each Rendezvous Point, such as the core routing device 114 and/or alternatively in a memory storage device 120 within the zone controller 116 of each Zone. By way of further example and not by way of limitation, Zones 1–4 may exhibit the maps, I, II, and III described herein above In association with FIG. 3, may be altered and modified without departing from the spirit of the present invention:

From block 402, flow proceeds to block 404 where a relationship is established between each subscriber device 348–656 and at least one zone of RF coverage. Said another way, each subscriber device 348–656 is associated with at least one system coverage zone (e.g., Zone 1–4). As will be appreciated by those skilled in the art this relationship or association can be static or dynamic and is typically a function of subscriber location or registration as previously described in association with the description of FIG. 3. Upon completion of steps 402 and 404, flow proceeds to block 406 where a Zone controller 116 receives a call request from a system subscriber 348–656 or from any of the devices operating within paging network 231, the PSTN 241, Inter/Intranet 271, Fax machine 261, or the like. In addition to a call request, the request received at block 416 can also be an affiliation request of the type typically sent by a subscriber unit 348–656 during power-up or as it migrates (i.e., roams) from one site to the next, or from one Zone to the next. The interested reader is referred to U.S. patent application Ser. No. 09/, filed Nov. 15, 2000, assigned to the assignee hereof, and entitled "Method For Implementing A Talk Group Call In A Multicast IP Network" for more details on the subscriber affiliation process.

From block 406 flow proceeds to block 408 where a determination is made whether the call request is a "private call" destined for a single subscriber or, in the alternative, a group call destined for transmission to a plurality of subscribers units, contemporaneously. Assuming the call is a private call, flow proceeds from block 408 to block 410. At block 410, flow branches to block 308 of FIG. 3 for purposes of continued call processing.

Assuming the call is a group call, flow proceeds from block 408 to block 412 if and when a group call request is detected at block 408. At block 412 the appropriate talk group identification is extracted from the call request as is known in the art. In keeping with the current working example, there are two separate talk groups as shown in FIG. 2., and identified by labels "A" and "B." Talk group "A" at least includes the subscriber units having reference numerals ending in 0, 2, and 4. Talk group "B" at least includes the subscriber unit having reference numeral ending in 6 and 8.

From block 412, flow proceeds to block 414 where the talk group identification information detected at block 408 is used to identify subscriber and/or payload devices involved in the group call and, in turn, their respective locations within the communication system of coverage. Again, for purposes of detail, the interested reader is directed to U.S. Pat. No. 5,724,648 granted, entitled and Issued to the assignee of the present Invention for additional information on the subject.

From block 414, flow proceeds to block 416 where the subscriber location data is used by the Zone controller 116 handling the call, or in the alternative, some form of centralized system control or call processing function known in the art but not shown in FIG. 2., to identify a single coverage zone having the largest concentration, by number, of Talk Group members. If no Zone is identified at block 416, protective measures, such as the time-out loop of blocks 418 and 420 should be employed to assure the call ends within a reasonable set of parameters such as, for example, time or resource availability. Upon the identification of a Zone at step 416, flow proceeds to step 422 where a Rendezvous Point is selected, in accordance with the preferred embodiment, as the core router 114 for the Zone identified at step 416.

From step 422, flow proceeds to step 424 where a determination is made whether there are sufficient communication resources, such as, for example the wireless communication resources 144, 146 of FIG. 2 or the wire line packet network 201 resources, such as, for example, T1 line, E1 digital carrier system resources, or the like, to establish the requested Talk Group. Assuming so, flow proceeds to steps 432 and 434 where one of the unique multicast IP addresses within the map of the selected Rendezvous Point is selected for use in association with the call in question, and thereafter, routed to all multicast routers within the packet network 201 of FIG. 2 for use during the delivery of pay load information to all Talk Group members, otherwise, time at loop 426 and 428 will operate to end the call.

Figure 5A:
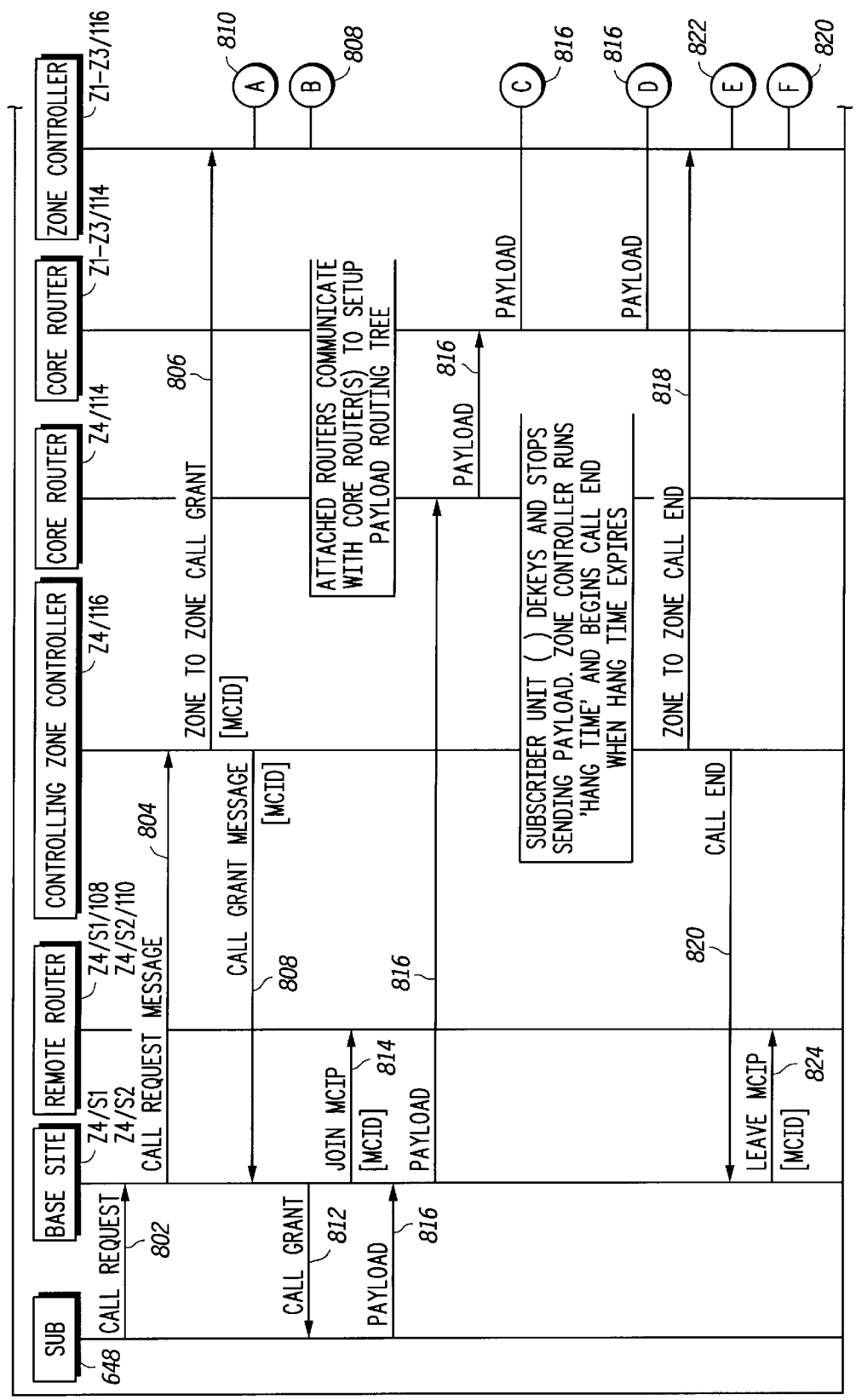
FIG. 5 is a partial message sequence chart associated with a subscriber initiated multi-zone Talk Group call according to the present invention.
Figure 5B:
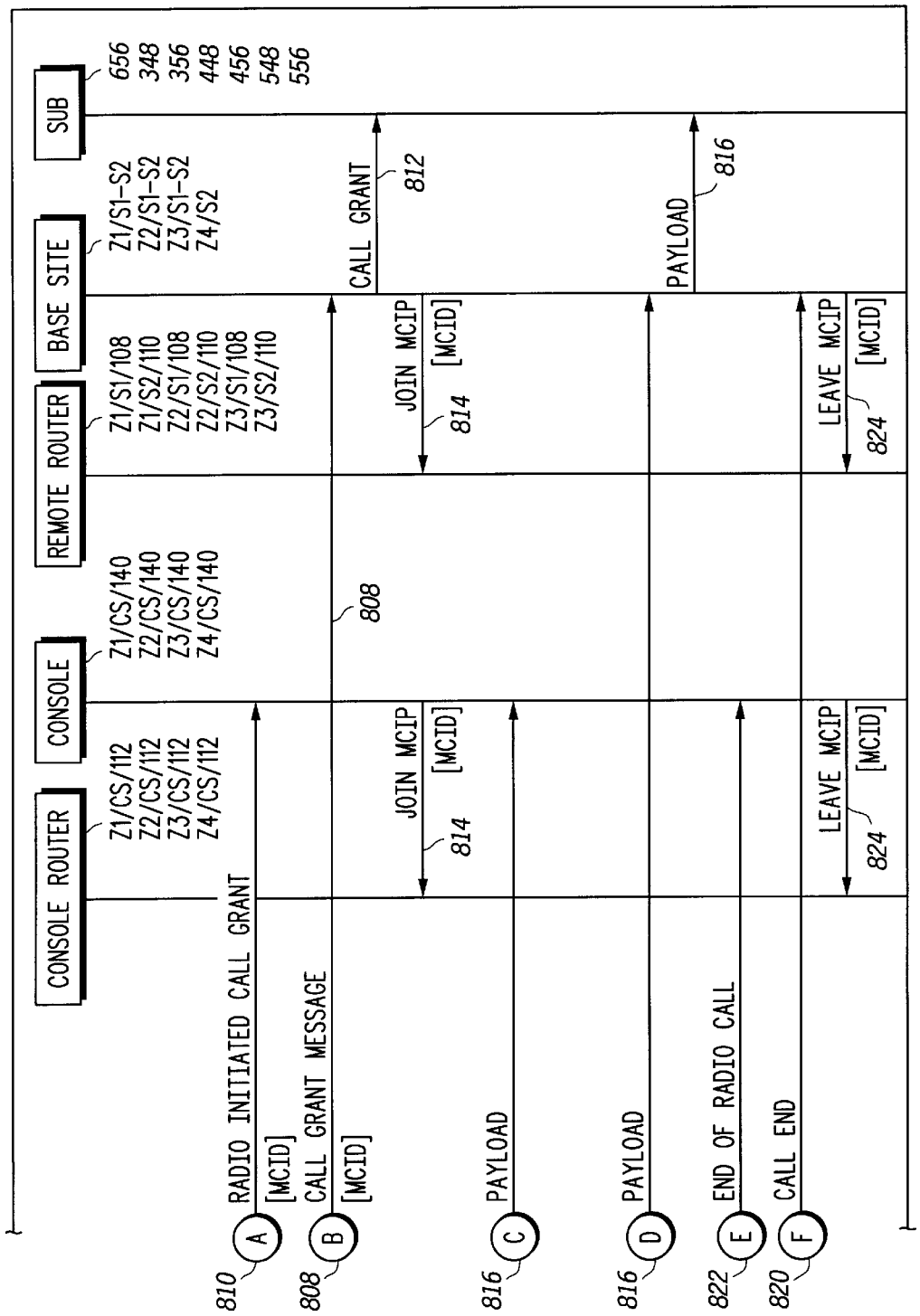

FIG. 5 is a partial message sequence chart depicting the call set up methodology for a subscriber initiated multi-zone Talk Group call according to the present invention. The message sequence chart depicts a Talk Group call sourced by subscriber unit 648 (site S1, zone 4). The subscriber unit 648 sends a Call Request 802 to its associated base site S1/Z4, which in turn sends a Call Request Message 804 to the Zone 4 Zone Controller 116 (Z4/116). In a preferred embodiment, the controlling zone controller Z4/116 is the Rendezvous Point for the multicast IP routing tree in question, and selected in accordance with a methodology of FIG. 3, 4, or 6 as presented herein. As such, the Rendezvous Point will be selected on a call-by-call basis and as a function of at least one of the following subscriber indicia; namely, user type (e.g., high or low priority), source device location, source device Home Zone, destination device location, destination device Home Zone, destination device distribution density, or any other available association or relationship that exists or is otherwise describable as a function of an association between a subscriber unit involved in the call and at least one of a plurality of coverage zones. Similarly, the Rendezvous Point may be selected as a function of at least one of the following communication system attributes; namely, bandwidth requirements, resource availability, network processing capacity, network response time, network traffic data, information technology and other knowledge and know-how regarding the system equipment, software, deployment, and/or installation, bit error rate (BER), received signal strength indication (RSSI), or any other measure of system performance or call quality, whether now known or later developed.

By way of example, and not by way of limitation, the call set-up described by the message sequence of FIG. 5 is based upon source device location. In accordance, upon receipt of the call request 802 from subscriber 648 and selection of core router Z4/114 as the Rendezvous Point in accordance with the flow chart of FIG. 3, zone controller Z4/116 sends a new call query (not shown in FIG. 8) to each participating zone controller having communication device(s) affiliated to the particular Talk Group. In accordance with the present example, this means Talk Group B. Thereafter, the Zone Controller Z4/116 will await response(s) from the participating zone controller(s) indicating whether their respective zone(s) have voice resources available to support the call. When all the responses have been received, the zone controller Z4/116 determines whether the call will be granted. If so, zone controller Z4/116 will select a multicast IP address from within its map and grants the call request. The multicast IP address comprises an address that is to be used for distributing payload to one or more device participating in the call. In accordance with aspects of preferred embodiments described In assocation with the operation of FIGS. 3, 4, and 6, the IP multicast address is selected by the Rendezvous Point zone controller on a call-by-call basis and as a function of at least one of the following subscriber indicia; namely, user type (e.g., high or low priority), source device location, source device Home Zone, destination device location, destination device Home Zone, destination device distribution density, or any other available association or relationship that exists or is otherwise describable as a function of an association between a subscriber unit involved in the call and at least one of a plurality of coverage zones. Similarly, the Rendezvous Point may be selected as a function of at least one of the following communication system attributes; namely, bandwidth requirements, resource availability, network processing capacity, network response time, network traffic data, information technology and other knowledge and know-how regarding the system equipment, software, deployment, and/or installation, bit error rate (BER), received signal strength indication (RSSI), or any other measure of system performance or call quality, whether now known or later developed.

Upon granting the call, the Rendezvous Point zone controller Z4/116 sends a Zone to Zone Call Grant packet 806, including the IP multicast group address, to participating zone controllers Z1/116–Z3/116. Alternatively or additionally, the IP multicast group address may be passed to the participating zone controllers in the new call query, before the call is granted. The participating zone controllers Z1/116–Z4/116 then send Call Grant Message(s) 808 to participating repeater sites and Radio Initiated Call Grant Messages 810 to participating console sites in their zones, as appropriate. In one embodiment, both the Call Grant Message(s) 808 and Radio Initiated Call Grant messages 810 include the IP multicast address, denoted MCID, associated with the Talk Group B, in accordance with the present example. In response to receiving the Call Grant Message(s) 808, the participating repeater sites send Call Grant packets 812 to their respective subscriber units 348, 356, 448, 456, 548, 556, and 658.

Upon receiving the IP multicast group address, the various participating devices send IGMP "Join" messages to their associated routers to signify their desire to join that IP multicast group address. Using a partial example of FIG. 5, the repeater sites Z4/S1 and Z4/S2 in Zone 4 associated with the sourcing subscriber units 648 and 656 send a Join MCIP packet 814 to its associated router Z4/S1/108 and Z4/S2/110. In zone 1, the repeater sites Z1/S1 and Z1/S2 associated with subscriber unit 348 and 356 send Join MCIP packets 814 to their associated routers Z1/S1/108, Z1/S2/110, and console Z1/CS/140 sends a Join MCIP packet 814 to its associated router Z1/CS/112. Upon receiving the "Join" messages, the routers Z4/S1/108, Z4/S2/110, Z1/S1/108, Z1/S2/110, and Z1CS/112 communicate with core routers Z4/114 and Z1/114, to set up the spanning tree between the participating devices of Talk Group B. As will be appreciated, the same type of routing activity will occur in Zones 2, and 3 for purposes of establishing communication with all Talk Group B members.

Once the router interfaces are established, payload messages addressed to the payload multicast group address are distributed by the router(s) and received at step by the participating devices. In the example of FIG. 5, the subscriber unit 648 sources a payload 816 to base site Z4/S1. The base site Z4/S1 sends the payload 816 to the Rendezvous Point core router Z4/114, which sends the payload to the other core routers Z1–Z3/114 and Z4/S2/110. Routers Z1–Z3/114, in turn, sends the payload to the participating consoles and base site in zones 1–3. The payload 816 is distributed to any other participating devices (not shown) in similar fashion.

When the call ends, the Rendezvous Point zone controller Z4/116 sends a Zone-to-Zone Call End packet 820 to zone controllers Z1–Z3/116. The controllers then send Call End Message(s) 820 to participating repeater sites and End of Radio Call messages 822 to participating console sites in their zones, as appropriate. Specifically, with reference to FIG. 5, Call End Message(s) 820 are sent from zone controller Z4/116 to base site Z4/S1 and Z4/S2, and from zone controllers Z1–Z3/116 to base sites Z1/S1 and S2, Z2/S1 and S2, and Z3/S1 and S2. In response to receiving the Call End Message(s) 820, the participating repeater sites Z1/S1–S2, Z2/S1–S2, and Z3/S1–S2, send Leave MCIP message(s) 824 to their associated routers Z1/S1/108, Z1/S2/110, Z2/S1/108, Z2/S2/110, Z3/S1/108, and Z3/S2/110 to leave the multicast group. Similarly, consoles Z1/CS/140, Z2/CS/140, and Z3/CS/140 S leaves the multicast group by sending Leave MCIP messages 824 to their associated routers Z1/CS/112, Z2/CS/112, and Z3/CS/112.

Figure 6:
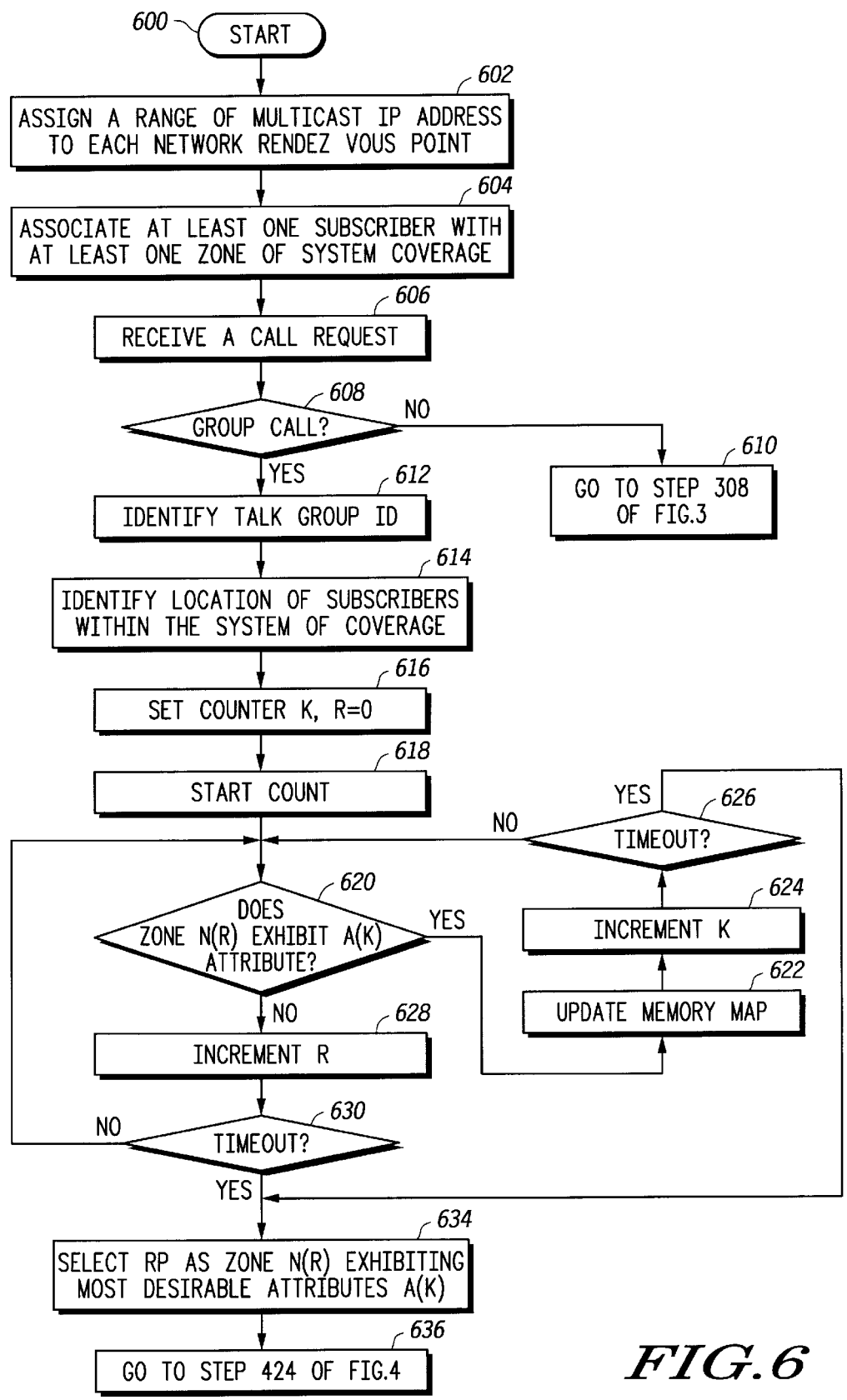
FIG. 6 is a flow chart illustrating the operation of selecting a multicast Rendezvous Point in accordance with other embodiments of the present invention.

FIG. 6 is a flow chart diagram illustrating the operation of selecting a multicast Rendezvous Point in accordance with other embodiments of the present invention. In particular, the flow chart diagram of FIG. 6 illustrates the selection of a Rendezvous Point or "multicast core" as a function of various communication system performance and/or quality of service (QOS) attributes, including but not limited to, bandwidth requirements, resource availability, network processing capacity, network response time, network traffic data, information technology and other knowledge and know-how regarding system equipment, system software, system integration, installation and/or deployment, bit error rate (BER), received signal strength indication (RSSI), quality of service (QOS) metrics, and any other measure of system performance or call quality, whether now known or later developed.

As will be appreciated upon further review hereof, flow commences at start block 600 and proceeds to step 602 where each Rendezvous Point in the packet network 201 of FIG. 2 is assigned a unique set of multicast IP addresses as previously described in association with the operation of FIGS. 3 and 4 above. By way of example, the information may be stored in memory at each Rendezvous Point, such as the core routing device 114 and/or alternatively in a memory storage device 120 within the zone controller 116 of each Zone. By way of further example and not by way of limitation, the unique set of IP multicast addresses assigned to each network Rendezvous Point may be selected by a System Manager or Administrator. In the alternative, it will be appreciated by those skilled in the art, after reading this description, that the Zone Controller 116 may independently make such assignments within each Zone. Of importance, if this task is delegated to the Zone Controllers 116 within a multi-zone communication system, it will be necessary to assure that each Zone Controller 116, assigns a unique set of IP multicast addresses to the Rendezvous Point within each zone. Said another way, the process of assigning a range of multicast IP addresses to each network Rendezvous Point (RP) includes a determination that no single IP multicast address is assigned to more than one network Rendezvous Point within the packet network 201 of FIG. 2.

In accordance with the preferred embodiment, the set of IP multicast addresses available within each zone are assigned to a single PIM-SM Rendezvous Point such as, for example, core router 114. As will be appreciated, all multicast enabled routers within the packet network 201 will pass a map of partitioned addresses to Rendezvous Points" to each other via well known routing protocols. This operation assures all routers in the packet network 201 receive an identical view of the IP multicast address partitioning and that every router in the network 201 knows the range of addresses supported by each Rendezvous Point. In accordance with the preferred embodiment, an election has been made to restrict the Rendezvous Point function to core router 114. As such, site routers 108–110 and console routers 112, while supporting IP multicast addressing, are not assigned the Rendezvous Point function in accordance with the preferred embodiment of the present invention.

Notwithstanding, it will be appreciated by those skilled in the art, after review hereof, that multicast IP addresses may be distributed across the entire class of routing devices, 108, 110, 112, and 114 within the packet network 201 of FIG. 2, so long as no single IP multicast address is assigned to more than one network Rendezvous Point, 108, 110, 112, and 114 within the packet network 201 of FIG. 2.

From step 602, flow proceeds to step 604 where a relationship is established between at least one subscriber device 348–656 and at least one zone of RF coverage Z1/S1–Z4/S2. Said another way, an association needs to be established between at least one subscriber device 348–656 involved in the call and at least one system coverage zone (e.g., Zone 1–4) supporting the call. As will be appreciated by those skilled in the art this relationship or association can be static or dynamic and is typically a function of subscriber location and/or registration as previously described in association with the description of FIG. 3.

Upon completion of steps 602 and 604, flow proceeds to step 606 where a Zone controller 116 receives a call request from a system subscriber 348–656 or from any of the devices operating within paging network 231, the PSTN 241, Inter/Intranet 271, Fax machine 261, as shown in FIG. 2, or the like.

From step 606 flow proceeds to step 608 where a determination is made whether the call request is a "private call" destined for a single subscriber or, in the alternative, a group call destined for transmission to a plurality of subscribers units, contemporaneously. Assuming the call is a private call, flow proceeds from step 608 to step 610. At step 610, flow branches to step 308 of FIG. 3 for purposes of continued call processing.

Assuming the call is a group call, flow proceeds from step 608 to step 612, if and when a group call request is detected at step 608. At step 612 the appropriate talk group identification is extracted from the call request as is known in the art. From step 612, flow proceeds to step 614 where the talk group identification information detected at step 608 is used to identify subscriber and/or payload devices involved in the group call and, in turn, their respective locations within the communication system 200 of FIG. 2.

From step 614, flow proceeds to steps 616–630 where counters for variables k and R, where k and R are integer values, are initialized and started, and a determination is made whether a Zone of interest, N(R), exhibits one or more of a class of attributes, A(k),. While such determination is being made, and stored in a memory map pursuant to step 622, protective measures, such as the time-out loop of steps 626 and 630, are employed to assure the call is serviced within a reasonable set of parameters such as, for example, time or resource availability.

From steps 626 or step 630 flow proceeds to step 634 where a Rendezvous Point is selected as a function of an attribute exhibited by at least one of subscriber devices involved in the call or a measure of system performance; namely, bandwidth requirements, resource availability, probability of a coverage zone being removed form the call, topology information of the cal, network processing capacity, network response time, network traffic data, information technology and other knowledge and know-how regarding the system equipment, software, deployment, and/or installation, bit error rate (BER), received signal strength indication (RSSI), or any other measure of system quality of service (QOS), whether now know or later developed. From step 634, flow proceeds to step 636, where flow branches back to step 424 of FIG. 4.

The foregoing description of a preferred embodiment of the invention has been presented for purposes of illustration and description, and is not intended to be exhaustive or to limit the invention to the precise form disclosed. The description was selected to best explain the principles of the invention and practical application of these principles to enable those skilled in the art to best utilize the invention. It is intended that the scope of the invention not be limited by the specification, but be defined by the claims set forth below. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a packet network communication system having a plurality of coverage zones, each zone being logically connected by one of more network routing device and serving a plurality of communication devices; a method of packet distribution comprising the steps of:

assigning a range of Multicast IP addresses to at least one network routing device;

associating at least one communication device with at least one of the plurality of coverage zones;

receiving a packet distribution request;

determining a location for at least one communication device involved with the request; and establishing, in response to the request, a multicast distribution tree having at least one network routing device selected as a rendezvous point, wherein the rendezvous point is selected as a function of the association between the at least one communication device involved in the request and the at least one coverage zone.

2. The method of claim 1 wherein the step of associating at least one communication device with at least one of the plurality of coverage zones further comprises the step of:

establishing for each communication device, a home coverage zone.

3. The method of claim 1 wherein the plurality of coverage zones utilize a wireless communication technology selected from the group consisting of radio frequency, infrared, electromagnetic, and electric field transmissions.

4. The method of claim 1, further comprising the step of assigning a range of IP multicast addresses to a plurality of network routing devices.

5. In a communication system having a plurality of communication devices distributed among one or more communication zones, the communication zones being logically interconnected by one or more networking devices, a packet distribution method comprising the steps of:

defining a range of multicast group addresses associated with a multicast core node;

receiving a packet distribution request from a source communication device;

selecting one of the networking devices as the multicast core node by determining a location for one or more target devices and selecting the multicast core node as a function of target device location; and selecting, from the range of multicast group addresses associated with the multicast core node, at least one multicast group address to be used for distributing packets to one or more target communication devices, wherein the source device is selected from the group of communication devices consisting of wireless and wire line communication devices, consoles, repeaters, site controllers, comparators, telephone interconnect devices, and Internet protocol telephony devices.

6. The method of claim 5 wherein the step of selecting the multicast core node is based on a geographical density of target devices within one or more communication zone.

7. The method of claim 5 wherein the step of selecting the multicast core node further comprises the steps:

determining a location for the source communication device; and selecting the multicast core node as a function of source device location.

8. The method of claim 5 wherein the step of selecting the multicast core node further comprises the steps of:

determining a home coverage zone for the source device; and selecting the multicast core node as a function of source device home zone.

9. The method of claim 5 wherein the step of selecting the multicast core node is based on network topology.

10. The method of claim 5 wherein the step of selecting the multicast core node is based on a probability of service loss at one or more communication zones.

11. The method of claim 5 further comprising the steps of:

distributing the at least one multicast group address to the target devices;

issuing, by the target devices, respective commands to one or more network devices to enable the target devices to receive messages via the at least one multicast group address;

sending, from the source device to the one or more network devices, at least one message addressed to the at least one multicast group address; and sending the at least one message from the one or more network devices to the target devices.

12. The method of claim 11, wherein the at least one multicast group address comprises a control multicast group address for distributing control messages to the target devices.

13. The method of claim 12, wherein the at least one multicast group address comprises a payload multicast group address for distributing payload to the target devices.

14. The method of claim 13, wherein the payload comprises any one of an audio payload, a data payload, a video payload, and a multimedia payload.

15. The method of claim 5, wherein the target devices are selected from the group communication devices consisting of wireless and wire line communication devices, consoles, repeaters, site controllers, comparators, telephone interconnect devices, internet protocol telephony devices, call loggers, scanners, and gateways.

16. In a packet network communication system having a plurality of coverage zones, each coverage zone being logically connected by one or more network routing device, a method of packet distribution comprising the steps of:

assigning a range of IP address to at least one network routing device;

associating the at least one communication device with a coverage zone;

receiving, from a source communication device, a call request; and establishing, in response to the call request, a multicast distribution tree having at least one network routing device selected as a rendezvous point (RP);

wherein the RP is selected as a function of the association between at least one communication device involved in the call and a coverage zones.

17. The method of claim 16 wherein the step of selecting a RP further comprises the steps of:

determining a location for one or more target device; and selecting the RP de as a function of target device location.

18. The method of claim 17 wherein the step of selecting the RP is based on a geographical density of target devices within one or more communication zone.

19. The method of claim 16 wherein the step of selecting a RP further comprises the steps:

determining a location for the source communication device; and selecting the RP as a function of source device location.

20. The method of claim 16 wherein the step of selecting a RP further comprises the steps of:
   determining a home coverage zone for the source device; and
   selecting the RP as a function of source device home zone.

21. The method of claim 16 wherein the step of selecting a RP Is based on network topology.

22. In a packet network communication system having a plurality of coverage zones, each coverage zone being logically connected by one or more network routing devices and serving a plurality of communication devices, a method of call set-up comprising the steps of:
   assigning a range of IP addresses to at least one network routing device;
   associating at least one communication device with a coverage zone;
   receiving, from a source device, a call request;
   establishing, in response to the call request, a multicast distribution tree having a single network routing device selected as a rendezvous point (RP);
   wherein the RP is selected as a function of an attribute exhibited by at least one device involved in the call.

23. The method of claim 22 wherein the attribute is selected from the group consisting of: source device location, destination device location, destination device density within a coverage zone, source device home zone, destination device home zone, talkgroup home zone.

24. The method of claim 22 wherein the RP is selected as a function of an attribute exhibited by the communication system.

25. The method of claim 24 where the attribute is selected from the group consisting of: bandwidth requirement, resource availability, network processing capacity, response time, data traffic flow, information technology, system know-how, integration, BER and RSSI.

* * * * *